(12) United States Patent
Hahin et al.

(10) Patent No.: US 7,881,616 B2
(45) Date of Patent: *Feb. 1, 2011

(54) TRANSCEIVER BASED LOOP BACK INITIATION

(75) Inventors: Jayne C. Hahin, Cupertino, CA (US); Gerald L. Dybsetter, Scotts Valley, CA (US); Luke M. Ekkizogloy, San Jose, CA (US); Stephen T. Nelson, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 1113 days.

This patent is subject to a terminal disclaimer.

(21) Appl. No.: 11/260,448

(22) Filed: Oct. 27, 2005

(65) Prior Publication Data

US 2006/0093372 A1 May 4, 2006

Related U.S. Application Data

(60) Provisional application No. 60/623,360, filed on Oct. 29, 2004.

(51) Int. Cl.
*H04B 10/00* (2006.01)

(52) U.S. Cl. .............................. 398/137; 398/4; 398/24

(58) Field of Classification Search ............ 398/2, 398/3, 4, 5, 6, 24, 137, 177
See application file for complete search history.

(56) References Cited

U.S. PATENT DOCUMENTS

| | | | |
|---|---|---|---|
| 4,784,454 A | 11/1988 | Dyott | |
| 5,019,769 A | 5/1991 | Levinson | |
| 5,035,481 A | 7/1991 | Mollenauer | |
| 5,144,632 A | 9/1992 | Thonn | |
| 5,812,572 A | 9/1998 | King et al. | |
| 5,978,113 A | 11/1999 | Kight | 359/110 |
| 6,400,737 B1 | 6/2002 | Broutin et al. | |
| 6,512,617 B1 | 1/2003 | Tanji et al. | |
| 6,590,644 B1 | 7/2003 | Coin et al. | |
| 6,618,425 B1 | 9/2003 | Carlesi et al. | |
| 6,898,702 B1 | 5/2005 | Evans | |
| 6,978,624 B2 | 12/2005 | Carlson et al. | |
| 7,215,891 B1 | 5/2007 | Chiang et al. | |
| 7,245,835 B1 | 7/2007 | Giaretta et al. | |
| 7,493,048 B2 | 2/2009 | Dybsetter et al. | |
| 7,509,050 B2 | 3/2009 | Ekkizogloy et al. | |
| 7,720,387 B2 | 5/2010 | Hahin et al. | |
| 2002/0027688 A1 | 3/2002 | Stephenson | |
| 2002/0078403 A1 | 6/2002 | Gullo et al. | |

(Continued)

OTHER PUBLICATIONS

U.S. Appl. No. 11/781,407, Mail Date Sep. 16, 2009, Office Action.

(Continued)

*Primary Examiner*—Nathan M Curs
(74) *Attorney, Agent, or Firm*—Workman Nydegger

(57) ABSTRACT

An operational optical transceiver configured to initiate operation in loop back mode. The optical transceiver includes transmit and receive signal paths, a memory capable of having microcode written to it, and a configurable switch array that is used to connect and disconnect the two signal paths as appropriate for a desired loop back mode. The microcode is structured to cause the optical transceiver to control the configurable switch array. This allows for analysis and diagnostics of the signal data.

21 Claims, 3 Drawing Sheets

U.S. PATENT DOCUMENTS

| | | |
|---|---|---|
| 2002/0097468 A1 | 7/2002 | Mecherle et al. |
| 2002/0143920 A1 | 10/2002 | Dev et al. |
| 2003/0223756 A1 | 12/2003 | Tatum et al. |
| 2004/0022537 A1 | 2/2004 | Mecherle et al. |
| 2004/0022543 A1 | 2/2004 | Hosking et al. |
| 2004/0033079 A1 | 2/2004 | Sheth et al. |
| 2004/0057730 A1 | 3/2004 | Littlejohn et al. |
| 2004/0136719 A1 | 7/2004 | Hidai et al. |
| 2004/0165888 A1 | 8/2004 | Gerstel et al. ............. 398/45 |
| 2005/0017751 A1 | 1/2005 | Gunn et al. |
| 2005/0105915 A1 | 5/2005 | Light |
| 2005/0111845 A1 | 5/2005 | Nelson et al. |
| 2006/0002707 A1 | 1/2006 | Ekkizogloy et al. |
| 2006/0002708 A1 | 1/2006 | Hahin et al. |
| 2006/0002709 A1 | 1/2006 | Dybsetter et al. |
| 2006/0020715 A1 | 1/2006 | Jungck |
| 2006/0034612 A1 | 2/2006 | Yu et al. |
| 2006/0051099 A1 | 3/2006 | Ekkisogloy et al. |
| 2006/0093372 A1 | 5/2006 | Hahin et al. |
| 2006/0098699 A1 | 5/2006 | Sanchez |
| 2006/0147217 A1 | 7/2006 | Hahin et al. |
| 2007/0253454 A1 | 11/2007 | Gustavson et al. |
| 2009/0028574 A1 | 1/2009 | Dybsetter et al. |

OTHER PUBLICATIONS

U.S. Appl. No. 11/781,407, Mail Date Apr. 12, 2010, Office Action.
U.S. Appl. No. 11/781,407, filed Jul. 23, 2007, Dybsetter, Gerald L.
U.S. Appl. No. 11/828,976, filed Jul. 26, 2007, Mei, Suohai.
U.S. Appl. No. 11/828,976, filed Dec. 31, 2009, Office Action.
U.S. Appl. No. 11/781,407, filed Jul. 23, 2007, Gerald L. Dybsetter.
U.S. Appl. No. 11/828,976, filed Jul. 26, 2007, Suohai Mei.
U.S. Appl. No. 11/828,976, mailed Dec. 31, 2009, Office Action.
U.S. Appl. No. 11/828,976, mailed Jul. 8, 2010, Non-final Office Action.
U.S. Appl. No. 11/883,208, mailed Mar. 8, 2007, Non-final Office Action.
U.S. Appl. No. 11/883,208, mailed Oct. 30, 2007, Final Office Action.
U.S. Appl. No. 11/883,208, mailed Apr. 16, 2008, Non-final Office Action.
U.S. Appl. No. 11/883,208, mailed Dec. 5, 2008, Final Office Action.
U.S. Appl. No. 11/883,208, mailed Jul. 21, 2009, Final Office Action.
U.S. Appl. No. 11/883,208, mailed Jan. 7, 2010, Notice of Allowance.
U.S. Appl. No. 11/883,208, mailed May 18, 2010, Issue Notification.

TRANSCEIVER BASED LOOP BACK INITIATION

CROSS-REFERENCE TO RELATED APPLICATIONS

This application claims the benefit of U.S. Provisional Application No. 60/623,360, filed Oct. 29, 2004, which is incorporated herein by reference in its entirety.

BACKGROUND

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The forgoing problems with the prior state of the art are overcome by the principles of the present invention, which relate to an optical transceiver configured to initiate operation in loopback mode. The optical transceiver includes a receive path comprising an opto-electric transducer that converts a received optical signal into an electrical signal and a post amplifier that processes the electrical signal. The optical transceiver also includes a transmit path comprising an electro-optic transducer driver that generates an electrical signal and an electro-optic transducer that converts the electrical signal into an optical transmit signal.

The transceiver further includes a configurable switch array capable of a connecting and disconnecting a node in the receive path between the opto-electric transducer and the post-amplifier with a node in the transmit path between the electro-optic transducer driver and the electro-optic transducer. In addition, the optical transceiver further includes a memory capable of having microcode written to it. The microcode is structured such that it causes the transceiver to control the configurable switch array. Advantageously, this allows the optical transceiver to initiate operation in loop back mode without the need for additional hardware.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an operational optical transceiver configured to initiate operation in loop back mode. The optical transceiver includes transmit and receive signal paths, a memory capable of having microcode written to it, and a configurable switch array that is used to connect and disconnect the two signal paths as appropriate for a desired loop back mode. The microcode is structured to cause the optical transceiver to control the configurable switch array. This allows for analysis and diagnostics of the signal data. An example operational optical transceiver environment will first be described. Then, the operation in accordance with the invention will be described with respect to the operational environment.

Figure 1:
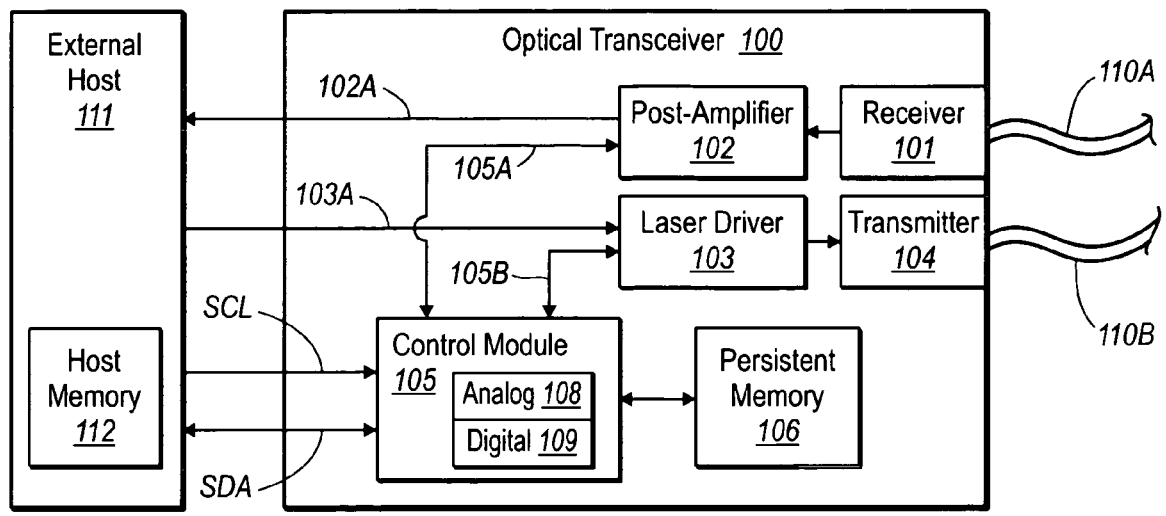
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, an electro-optic transducer driver 103 (also referred to a laser driver 103) receives the electrical signal as represented by the arrow 103A, and drives an electro-optic transducer 104 (also referred to as transmitter 104) with signals that cause the transmitter 104 (e.g., a laser or Light Emitting Diode (LED)) to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
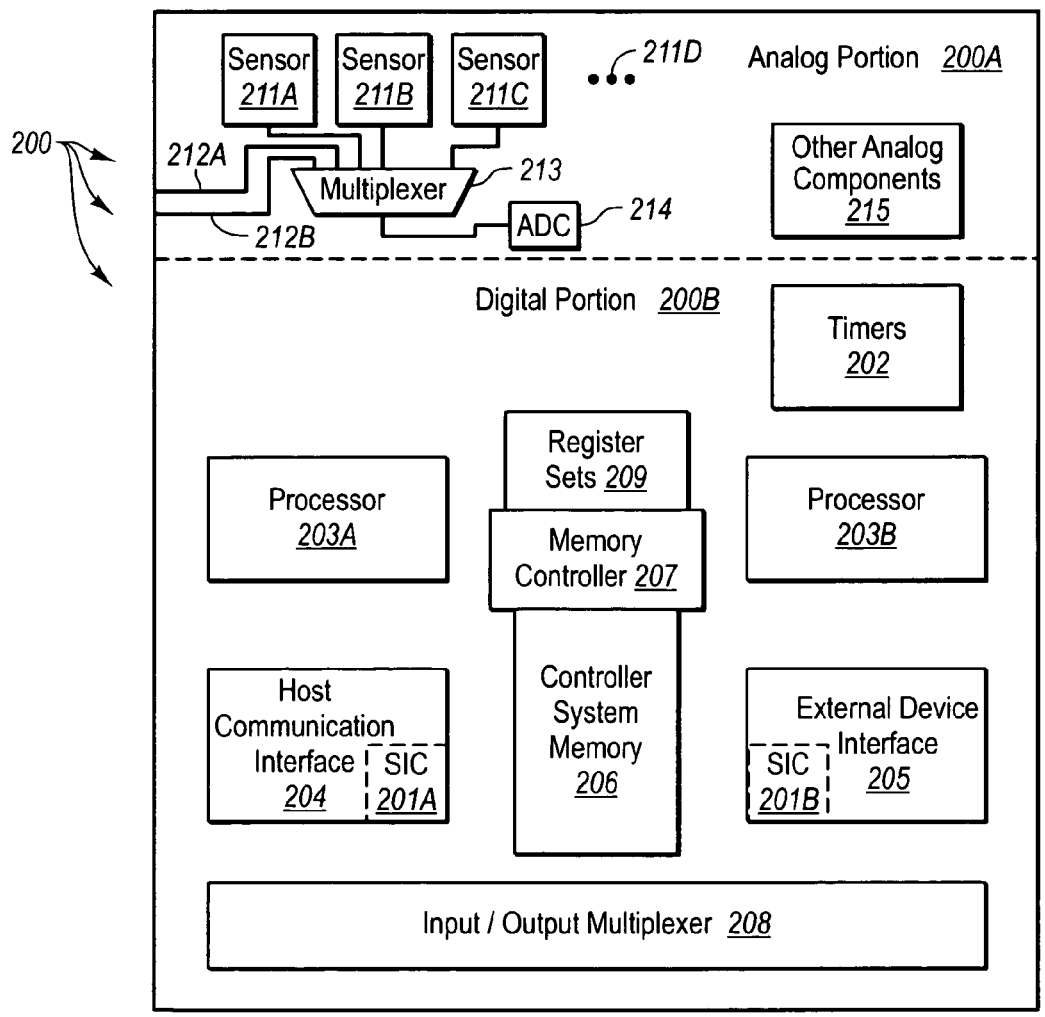
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that may be configured to initiate operation in loop back mode.

In many instances, it is desirable to operate an optical transceiver in loop back mode. In the specification and in the claims, loop back mode occurs when a signal from either the transmit path or the receive path is made to loop back and flow onto the other path. This allows for diagnostics and analysis of the signal, thereby testing the functionality of components within the transmit and receive paths. However, optical transceivers are not configured to initiate operation in loop back mode by themselves. Instead, an optical transceiver host computing system initiates and controls any loop back mode operation. The host often required additional hardware such as a Field Programmable Gate Array (FPGA) for loop back mode operation. This may be expensive. In addition, the use of other hardware such as a FPGA often slows down the response time of the optical transceiver. The principles of the present invention allow for configuring the optical transceiver to initiate loop back mode.

Figure 3:
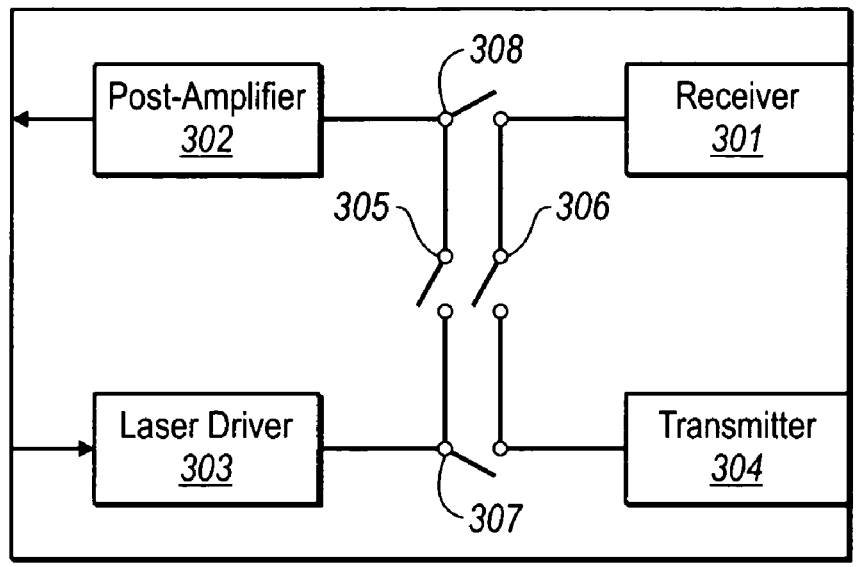
FIG. 3 schematically illustrates an example of an optical transceiver portion including a configurable switch array in accordance with an embodiment of the present invention.

FIG. 3 depicts a more detailed view of a portion 300 of an optical transceiver configured to implement the principles of the present invention. The portion 300 includes receiver 301 (also referred to as an opto-electric transducer) and post-amplifier 302 in the receive path, and laser driver 303 (also referred to as an electro-optic transducer driver) and transmitter 304 (also referred to as an electro-optic transducer) in the transmit path. For example, if the portion 300 was implemented within the specific optical transceiver 100 of FIG. 1, components 301 through 304 of FIG. 3 could be the same as components 101 through 104 of FIG. 1 although this is not required. Operation of the present invention will be described with reference to FIGS. 1, 2, and 3.

FIG. 3 shows a configurable switch array dispersed amongst and between the transmit and receive paths. As will be appreciated by one skilled in the art, the specifically illustrated configurable switch is only one example of many possible configurable switch arrays that may be used to facilitate the principles of the present invention. In the specification and in the claims, the configurable switch array may be any switch array, whether now known or discovered in the future, that may be configured by microcode. In the description and in the claims, "microcode" is defined to mean any type of operational or control code, such as, but not limited to, firmware and software, that runs on a microprocessor and controls the operation of the transceiver when executed. For example, each individual switch in the configurable switch array may be as straightforward as being a single transistor. However, the switches may be more complex, involving potentially many circuit components. The depicted configurable switch array of FIG. 3 is illustrated and will be described as conceptually including switches 305 through 308.

In many instances, when switches 305 through 308 open and close while connecting the transmit and receive paths during loop back operation, as will described in more detail to follow, an undesirable capacitive interaction may be introduced into the transmitted and received signals. This capacitive effect may distort or otherwise degrade the transmitted and received signals. To reduce the capacitive effect, switches 305 through 308 may be implemented as a low capacitive switching array. Low capacitive switching arrays are well known in the art and need not be described in further detail.

Referring back to FIG. 2, transceiver control module 200, as described above, contains processors 203 and a bank of register sets 209. In some embodiments, it may be possible that one or more of the registers 209 may be memory mapped to combinational logic that control switches 305 through 308. The processors 203 may write microcode to these registers to control the operation of the switches. For example, a register from register sets 209 may be a one byte register that includes a single bit of digital data that controls whether a corresponding switch in the configurable switch array is open or closed. For example, if the switch in the configurable switch array receives a binary 1, then the switch may close. Conversely, if the switch receives a binary 0, then the switch may open.

In another embodiment, control module 200 may have a dedicated memory location that may be dedicated to receive high-level commands. This dedicated memory location may be for receiving only high-level commands for controlling the configurable switch array to thereby initiate or terminate certain loop back modes. Alternatively, the memory location may receive a variety of high-level commands over time, including high-level commands for controlling loop back modes. The memory location may be a register in register sets 209 or it may be a portion of controller system memory 206. A user would write a command to the dedicated memory location directing that transceiver 100 enter loop back mode. Alternatively, the host 111 may write the command to the memory location. The processors 203 would then poll the memory location for a command or read an interrupt that is initiated when new data is written to the memory location. If a loop-back control command was found, the processors 203 would then direct the appropriate switch(es) to close or open so as to initiate operation in loop back mode.

The processors 203 may control the configurable switch array to have a specific configuration in response to a user input. For example, a user or the host 11I may specify that electrical loop back is desired, and the processors 203 may control the configurable switch array accordingly. However, the processors 203 may, in response to execution of microcode, perform their own evaluation on whether or not loop back mode is desired, and which loop back mode to enter. For example, if low receive power is detected, then the processors 203 may enter loop back mode without external instructions.

For example, suppose that the portion 300 of the optical transceiver was transmitting and receiving signals in normal operation without being in loop back mode. Switches 305 and 306 would be open and switches 307 and 308 would be closed, thus keeping the transmit and receive paths intact, and isolating the transmit and receive paths from each other.

When a malfunction is detected, or the optical transceiver is to be tested, there are a variety of different loop back modes that may be appropriate to diagnose a problem or to test a component. These various loop back modes are described and illustrated with respect to FIGS. 4 through 8.

Figure 4:
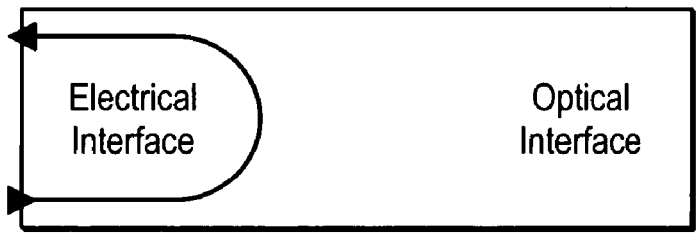
FIG. 4 illustrates an embodiment of operation in a first loop back mode.

In one possible loop back mode, the transmit electrical signal flows onto the receive path at the electrical interface while transceiver 100 ceases to transmit. This loop back mode is illustrated by FIG. 4. In this case, referring to FIG. 3, a binary 1 is provided to switch 305, causing switch 305 to close. This would cause a connection between the transmit and receive signal paths. Switches 307 and 308 would receive a binary 0, which would cause them to open. In this way, the transmit electrical signal from laser driver 303 would flow back into post-amplifier 302. Control module 105 would then be able to analyze the transmit electrical signal. In this mode, if the received signal was the same as the transmit signal, then it could be quickly inferred that the post-amplifier 302 and the laser driver 303 were functioning properly. This information could be communicated to the host 111 for analysis.

Figure 5:
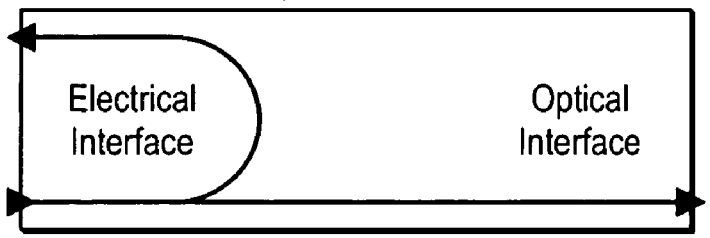
FIG. 5 illustrates an embodiment of operation in a second loop back mode.

In another possible loop back mode, the transmit electrical signal flows onto the receive path at the electrical interface while transceiver 100 continues to optically transmit. This loop back mode is illustrated by FIG. 5. In this case, referring to FIG. 3, a binary 1 is provided to switch 305, causing it to close and make a connection between the two signal paths. A binary 1 is also provided to switch 307 causing it to close (or remain closed), and thereby keeping the transmit path fully intact. Switch 308 would receive a binary 0 which would cause it to open. In this way, the optically received signal would not contribute to the electrically received signal measured after the post-amplifier 302. Once again, in this mode, if the received signal was the same as the transmit signal, then it could be quickly inferred that the post-amplifier 302 and the laser driver 303 were functioning properly. However, if there were not problem with the complete link on the transmit path to the other optical transceiver, then the transmit path may remain intact thereby being productive even during loop back diagnostics. Once again the results could be communicated to the host 111 for analysis.

In some instances it may also be necessary for the optical transceiver 100 to initiate loop back mode for the optical signal interface of the transmit and receive paths. In this case, a remote optical transceiver that may be communicatively coupled to optical transceiver 100 by fibers 110 may sense that the optical signal being transmitted by the remote transceiver is not correct. The remote transceiver may communicate with transceiver 100 and ask it to initiate operation in optical loop back mode. As in both of the electrical loop back modes described above, control module 105 would initiate the optical loop back mode. Processors 203 would write data to a register in register sets 209 that was memory mapped to control the switches as described above. Alternatively, a command may be written to the dedicated memory location.

Figure 6:
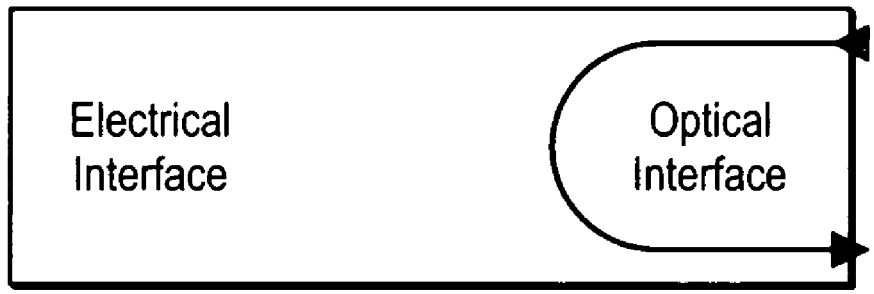
FIG. 6 illustrates an embodiment of operation in a third loop back mode.

In a third loop back mode, illustrated in FIG. 6, the optical signal from the remote transceiver is sent to receiver 301. The optical signal then flows from the receive path to the transmit path at the optical interface and is transmitted by transmitter 304 back to the remote transceiver. In this case, referring to FIG. 3, a binary 1 is sent to switch 306, causing it to close and connect the receive and transmit optical paths, allowing the optical signal to flow from receiver 301 to transmitter 304. A binary 0 is sent to switches 307 and 308, causing them to open. This prevents the optical signal from flowing to post-amplifier 302 and laser driver 303. This mode allows the remote transceiver to compare the signal it has sent to transceiver portion 300 with the signal transceiver portion 300 transmits back. From this information, the remote transceiver may be able to diagnose whether the fibers permit an optical signal to be transmitted and received, and/or whether the transmitters and receivers are functioning.

Figure 7:
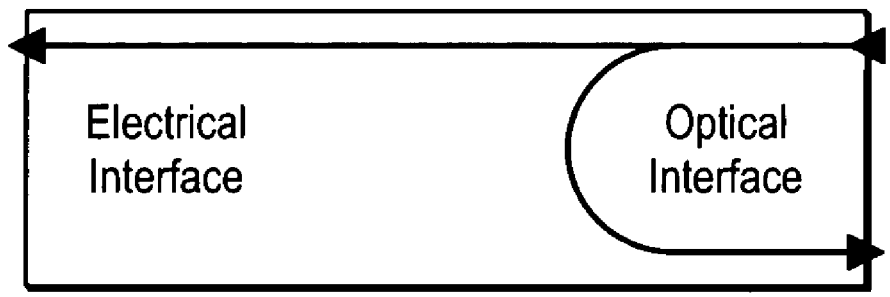
FIG. 7 illustrates an embodiment of operation in a fourth loop back mode.

In a fourth possible loop back mode, transceiver 100 may receive the optical signal while causing the optical signal to flow onto the transmit path at the optical interface and causing the signal to be transmitted back to the remote transceiver. This is illustrated in FIG. 7. In this case, referring to FIG. 3, a binary 1 is sent to switch 306, causing it to close and connect the receive and transmit paths, allowing the optical signal to flow to transmitter 304 for transmission back to the remote transceiver. Switch 308 also receives a binary 1 and closes, allowing the optical signal to flow from receiver 301 to post-amplifier 302. Switches 305 and 307 would each receive a binary 0 and would open, preventing the laser driver 303 from impacting the signal received by the host 111 and the optical signal returned to the remote transceiver, respectively. This mode allows the remote transceiver to compare the signal it has sent to transceiver 100 with the signal transceiver 100 transmits back and also allows analysis of the signal by transceiver 100.

Figure 8:
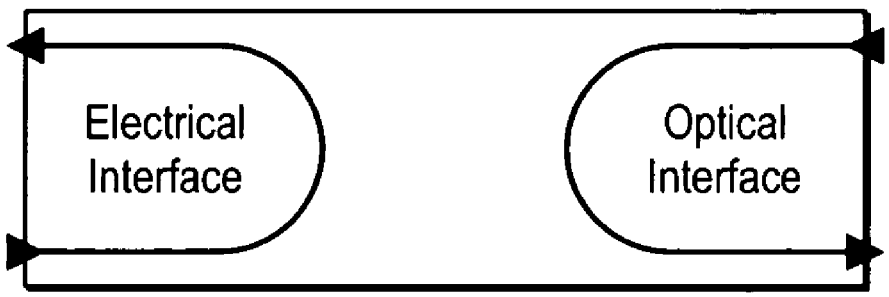
FIG. 8 illustrates an embodiment of operation in a fifth loop back mode.

In a fifth possible loop back mode, it may be desirable to perform electrical and optical loop backs simultaneously. The electrical signal from transceiver 100 is made to flow back onto the receive path. The optical signal from the remote transceiver is made to flow onto the transmit path. This is illustrated in FIG. 8. In this case, referring to FIG. 3, a binary 1 is sent to switches 305 and 306, causing them to close. A binary 0 is sent to switches 307 and 308 causing them to open. Closing switch 305 allows the transmit electrical signal from laser driver 303 to flow back into post-amplifier 302. Control module 105 would then be able to analyze the transmit electrical signal. Closing switch 306 allows the optical signal from the remote transceiver to flow from the receiver 301 to transmitter 304 where it is transmitted back to the remote transceiver. The remote transceiver may then analyze the signal.

Control module 105 may also initiate the end of operation in loop back mode. Control module 105 may determine that it is no longer desirable to operate in loop back mode. Processors 203 would write the appropriate logic to a register in register sets 209 or would read a command written to the dedicated memory location. This register would in turn provide a binary 1 to switches 307 and 308 and cause them to close or remain closed, depending of which loop back mode described above was being implemented. A binary 0 would be provided to switches 305 and 306, causing them to open. Alternatively, the command in the dedicated memory location would cause processors 203 to close switches 307 and 308 and to open switches 305 and 306. This would disconnect the transmit and receive paths and would allow for normal receiving and transmitting of signals by transceiver 100.

In another embodiment, it may be possible to configure host 111 to cause transceiver 100 to initiate loop back mode. Host 111 may receive information from transceiver 100 regarding such operational parameters as transmit and receive power. When these parameters reach a certain value, host 111 may automatically direct control module 105 to initiate loop back mode by sending directions to control module 105 over the SCL and SDA lines. For example, if the host received information that the transmit power was too low, then the host may direct control module to initiate loop back mode 2 in the manner described above. This would help ascertain if the problem causing the low transmit power was in the electric transmit signal, was a broken transmit fiber 110B, or some other cause. In like manner, the host 111 may direct that control module 105 initiate and perform the other loop back modes in the manner previously described.

Host 111 may also act as a backup for transceiver initiation of loop back operation. As mentioned previously, the transceiver 100 may be configured to initiate loop back mode on in own in the manner described. However, should transceiver 100 fail to properly initiate loop back mode on its own for whatever reason, then host 111 may step in and force transceiver 100 to begin loop back mode operation. This may be a very beneficial safeguard.

In an additional embodiment, it may be possible for a user to cause transceiver 100 to operate in loop back mode. For example, suppose a user desired to analyze the transmit electric signal to verify that it was at a correct level. The user would be able to direct host 111 by use of an attached keyboard or mouse to cause control module 105 to initiate loop back mode 1 by opening and closing switches 305-308 in the manner already discussed. The user would also be able to cause transceiver 100 to operate in any of the loop back modes discussed. This would give the user the ability to run various diagnostics on transceiver 100 through use of the different loop back modes.

In a further embodiment, it may be possible to initiate operation in loop back mode by toggling or otherwise switching an input/output pin or wire or group of input/output pins or wires of the control module 105. For example, a first pin may be configured to cause operation in one of the loop back modes previously discussed when a designated pin is in a low voltage and configured to cause operation in a different loopback when in a high voltage position. When the pin was in a neutral position, then perhaps no loop back mode operation is implemented. The pin or pins may be configurable by microcode to operate in a given loop back mode. For example, one user may only desire operation in loop back mode 1 while anther user may desire operation in loop back mode 4 and the one or more pins may be configured to produce this result.

In other embodiments, the configurable switch array may be contained within the laser driver 303 chip or the post-amplifier 302 chip. Switches 305-308 may be configured to open and close when a given input/output pin of the chip that is tied to the particular switch is toggled from low to high voltage or low to high voltage. In this manner, operation in the various loop back modes already discussed may be implemented by the optical transceiver.

The principles of the present invention provide for an optical transceiver with many benefits over current optical transceivers. Specifically, the present invention allows for transceiver based loop back initiation. The transceiver is configured to initiate operation in loop back mode by connecting and disconnecting the transmit and receive paths as needed. This allows for analysis and determination of transmit or receive signal path problems. In addition, the host may be configured to direct the transceiver to initiate loop back mode. This provides an important backup should the transceiver fail to initiate loop back mode on its own. Finally, a user is able to direct that the transceiver initiate loop back mode. This provides an effective way for the user to analyze desired signal paths in the transceiver. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver comprising the following:
   a receive path comprising an opto-electric transducer configured to convert a received optical signal into a received electrical signal, and a post-amplifier configured to process the received electrical signal;
   a transmit path comprising an electro-optic transducer driver configured to generate an electrical transmit signal, and an electro-optic transducer configured to convert the electrical transmit signal into an optical transmit signal;
   a configurable switch array capable of selectively connecting and disconnecting a node in the receive path between the opto-electric transducer and the post-amplifier with a node in the transmit path between the electro-optic transducer driver and the electro-optic transducer;
   a memory capable of having microcode written to it, wherein the microcode is structured to cause the optical transceiver to initiate operation in loop back mode by performing the following:
   an act of controlling the configurable switch array.

2. An optical transceiver in accordance with claim 1, wherein the configurable switch array comprises:
   a first switch for connecting the electro-optic transducer driver to the post-amplifier;

a second switch for connecting the opto-electric transducer to the electro-optic transducer;

a third switch for connecting the electro-optic transducer driver to the electro-optic transducer; and a fourth switch for connecting the post-amplifier to the opto-electric transducer.

3. An optical transceiver in accordance with claim 1, wherein the act of controlling the configurable switch array comprises:

an act of the configurable switch array connecting the node in the receive path with the node in the transmit path to cause the electro-optic transducer driver to provide a signal to the post-amplifier while ceasing to provide a signal to the electro-optic transducer.

4. An optical transceiver in accordance with claim 1, wherein the act of controlling the configurable switch array comprises:

an act of the configurable switch array connecting the node in the receive path with the node in the transmit path to cause the electro-optic transducer driver to provide a signal to the post-amplifier while continuing to provide a signal to the electro-optic transducer.

5. An optical transceiver in accordance with claim 1, wherein the act of controlling the configurable switch array comprises:

an act of the configurable switch array connecting the node in the receive path with the node in the transmit path to cause the opto-electric transducer to provide a signal to the electro-optic transducer while ceasing to provide a signal to the post-amplifier.

6. An optical transceiver in accordance with claim 1, wherein the act of controlling the configurable switch array comprises:

an act of the configurable switch array connecting the node in the receive path with the node in the transmit path to cause the opto-electric transducer to provide a signal to the electro-optic transducer while continuing to provide a signal to the post-amplifier.

7. An optical transceiver in accordance with claim 1, wherein the node between the receive and transmit paths is a first node and the configurable switch array is further capable of selectively connecting and disconnecting a second node in the receive path between the opto-electric transducer and the post-amplifier with a second node in the transmit path between the electro-optic transducer driver and the electro-optic transducer, the act of controlling the configurable switch array comprising:

an act of the configurable switch array connecting the first node in the receive path with the first node in the transmit path that causes the electro-optic transducer driver to provide a signal to the post-amplifier while ceasing to provide a signal to the electro-optic transducer; and an act of the configurable switch array connecting the second node in the receive path with the second node in the transmit path that causes the opto-electric transducer to provide a signal to the electro-optic transducer while ceasing to provide a signal to the post-amplifier.

8. An optical transceiver in accordance with claim 1, wherein the memory is one or more registers that are memory mapped to the configurable switch array.

9. An optical transceiver in accordance with claim 1, wherein the memory is a dedicated memory location for receiving high-level commands for controlling the configurable switch array.

10. An optical transceiver in accordance with claim 1, wherein the optical transceiver initiates operation in loop back mode in response to detecting an operational error.

11. An optical transceiver in accordance with claim 1, wherein the optical transceiver initiates operation in loop back mode in response to a user request for diagnostics.

12. An optical transceiver in accordance with claim 1, wherein the optical transceiver initiates operation in loop back mode in response to a request from a host computing system.

13. An optical transceiver in accordance with claim 1 further comprising:

while the optical transceiver is operating in loop back mode, an act of the optical transceiver initiating the end of operation in loop mode in response to a determination that loop back mode operation is no longer desired.

14. An optical transceiver in accordance with claim 1, wherein the configurable switch array is a low capacitive switching array.

15. An optical transceiver in accordance with claim 1, wherein the optical transceiver initiates operation in loop back mode in response to an input/output pin being toggled.

16. In an optical transceiver including a receive path comprising an opto-electric transducer configured to convert a received optical signal into a received electrical signal, and a post-amplifier configured to process the received electrical signal, a transmit path comprising an electro-optic transducer driver configured to generate an electrical transmit signal, and an electro-optic transducer configured to convert the electrical transmit signal into an optical transmit signal a configurable switch array capable of selectively connecting and disconnecting a node in the receive path between the opto-electric transducer and the post-amplifier with a node in the transmit path between the electro-optic transducer driver and the electro-optic transducer and a memory capable of having microcode written to it, the microcode structured to cause the optical transceiver to control the configurable switch array, a method for the optical transceiver to initiate operation in loopback mode, the method comprising:

an act of controlling the configurable switch array.

17. The method in accordance with claim 16, wherein the act of controlling the configurable switch array comprises:

an act of the configurable switch array connecting the node in the receive path with the node in the transmit path to cause the electro-optic transducer driver to provide a signal to the post-amplifier while ceasing to provide a signal to the electro-optic transducer.

18. The method in accordance with claim 16, wherein the act of controlling the configurable switch array comprises:

an act of the configurable switch array connecting the node in the receive path with the node in the transmit path to cause the electro-optic transducer driver to provide a signal to the post-amplifier while continuing to provide a signal to the electro-optic transducer.

19. The method in accordance with claim 16, wherein the act of controlling the configurable switch array comprises:

an act of the configurable switch array connecting the node in the receive path with the node in the transmit path to cause the opto-electric transducer to provide a signal to the electro-optic transducer while ceasing to provide a signal to the post-amplifier.

20. The method in accordance with claim 16, wherein the act of controlling the configurable switch array comprises:

an act of the configurable switch array connecting the node in the receive path with the node in the transmit path to cause the opto-electric transducer to provide a signal to the electro-optic transducer while continuing to provide a signal to the post-amplifier.

21. The method in accordance with claim 16, wherein the node between the receive and transmit paths is a first node and the configurable switch array is further capable of selectively connecting and disconnecting a second node in the receive path between the opto-electric transducer and the post-amplifier with a second node in the transmit path between the electro-optic transducer driver and the electro-optic transducer, the act of controlling the configurable switch array comprising:

an act of the configurable switch array connecting the first node in the receive path with the first node in the transmit path that causes the electro-optic transducer driver to provide a signal to the post-amplifier while ceasing to provide a signal to the electro-optic transducer; and an act of the configurable switch array connecting the second node in the receive path with the second node in the transmit path that causes the opto-electric transducer to provide a signal to the electro-optic transducer while ceasing to provide a signal to the post-amplifier.

* * * * *